US011053886B2

(12) United States Patent
Whurr et al.

(10) Patent No.: US 11,053,886 B2
(45) Date of Patent: Jul. 6, 2021

(54) SUPERSONIC AIRCRAFT TURBOFAN

(71) Applicant: ROLLS-ROYCE plc, London (GB)

(72) Inventors: John R Whurr, Derby (GB); Conor Hickey, Bristol (GB)

(73) Assignee: ROLLS-ROYCE plc, London (GB)

(*) Notice: Subject to any disclaimer, the term of this patent is extended or adjusted under 35 U.S.C. 154(b) by 215 days.

(21) Appl. No.: 16/456,870

(22) Filed: Jun. 28, 2019

(65) Prior Publication Data

US 2020/0025108 A1    Jan. 23, 2020

(30) Foreign Application Priority Data

Jul. 20, 2018  (GB) ...................................... 1811919

(51) Int. Cl.
| F02K 1/08 | (2006.01) |
| F02K 3/06 | (2006.01) |
| F02K 1/38 | (2006.01) |
| F02K 1/12 | (2006.01) |
| F02K 1/15 | (2006.01) |

(52) U.S. Cl.
CPC .............. *F02K 1/08* (2013.01); *F02K 1/1207* (2013.01); *F02K 1/15* (2013.01); *F02K 1/386* (2013.01); *F02K 3/06* (2013.01); *F05D 2220/80* (2013.01)

(58) Field of Classification Search
CPC ... F02K 1/15; F02K 1/08; F02K 1/386; F02K 3/06
See application file for complete search history.

(56) References Cited

U.S. PATENT DOCUMENTS

| 3,841,091 A  * | 10/1974 | Sargisson ................. F02K 1/08 60/226.3 |
| 4,085,583 A  * | 4/1978 | Klees ...................... F02K 3/075 60/262 |
| 5,372,006 A  * | 12/1994 | Lair ......................... F02K 1/60 60/226.2 |
| 10,378,477 B2 * | 8/2019 | Pesyna .................... F02K 3/077 |
| 2004/0065502 A1 | 4/2004 | Yamamoto |

(Continued)

FOREIGN PATENT DOCUMENTS

| EP | 1 344 928 A2 | 9/2003 |
| FR | 1373 227 A | 9/1964 |

(Continued)

OTHER PUBLICATIONS

Jan. 16, 2019 Search and Examination Report issued in Great Britain Patent Application No. GB1811919.8.

(Continued)

*Primary Examiner* — Ted Kim
(74) *Attorney, Agent, or Firm* — Oliff PLC

(57) ABSTRACT

A turbofan engine having: an engine core having a centre axis and including in flow series a compressor, a combustor and a turbine; and a bypass duct surrounding the engine core, the bypass duct has a bypass duct exit area at its downstream end. The engine further includes an exhaust nozzle assembly including: coaxially arranged inner mixer and outer exhaust nozzles, the exhaust nozzle being axially downstream of said mixer nozzle; a core flow duct defined by the mixer nozzle, the core flow duct having a core exit area; and an exhaust duct defined at least in part by the exhaust nozzle downstream of the mixer nozzle, the exhaust duct having an exhaust throat area.

16 Claims, 5 Drawing Sheets

(56) References Cited

U.S. PATENT DOCUMENTS

| | | |
|---|---|---|
| 2009/0158704 A1 | 6/2009 | Whurr et al. |
| 2016/0010590 A1* | 1/2016 | Rolt ........................ F02K 1/08 60/805 |
| 2016/0153397 A1 | 6/2016 | Lovett |
| 2018/0094605 A1* | 4/2018 | Rosenau .................. F02K 1/60 |

FOREIGN PATENT DOCUMENTS

| | | | |
|---|---|---|---|
| GB | 2244098 A | * 11/1991 | ............ F02K 1/386 |
| GB | 2247924 A | 3/1992 | |
| WO | 2007/093760 A1 | 8/2007 | |

OTHER PUBLICATIONS

Dec. 20, 2019 Extended Search Report issued in European Patent Application No. 19182551.2.

* cited by examiner

SUPERSONIC AIRCRAFT TURBOFAN

CROSS-REFERENCE TO RELATED APPLICATIONS

This specification is based upon and claims the benefit of priority from United Kingdom patent application number GB 1811919.8 filed on Jul. 20 2018, the entire contents of which are incorporated herein by reference.

BACKGROUND

Field of the Disclosure

The present disclosure relates to a turbofan engine such as a turbofan engine for use on a supersonic aircraft.

Description of the Related Art

There is a growing interest in the development of supersonic aircrafts for civil use. In particular, gas turbine engine systems that effectively provide thrust in subsonic, transonic and supersonic flight regimes, with reduced noise output during certain operations, are of interest.

A turbofan engine typically comprises, in axial flow series, an air intake, a propulsive fan, an intermediate pressure compressor, a high-pressure compressor, combustion equipment, a high-pressure turbine, an intermediate pressure turbine, a low-pressure turbine and an exhaust nozzle. A nacelle generally surrounds the engine and defines both the intake and the exhaust nozzle.

Air entering the intake is accelerated by the fan to produce two air flows: a core flow into the intermediate pressure compressor and a bypass flow which passes through a bypass passage to provide propulsive thrust. The intermediate pressure compressor compresses the air flow directed into it before delivering that air to the high pressure compressor where further compression takes place.

The compressed air exhausted from the high-pressure compressor is directed into the combustion equipment where it is mixed with fuel and the mixture combusted. The resultant hot combustion products then expand through, and thereby drive the high, intermediate and low-pressure turbines before being exhausted through the nozzle to provide propulsive thrust.

Mixed turbofans combine the (hot) core and (cooler) bypass flows upstream of the nozzle to gain thrust from the combining of two streams of different temperatures. The axial location of the point at which the two streams are brought into contact, thereby starting the mixing process, is termed the mixing plane. A mixer nozzle is typically provided with an outlet at the mixing plane. A number of different types of mixer nozzles are known. For example, the mixer nozzle may comprise a series of lobes, chutes or serrations to promote mixing between the core flow and bypass flow.

Varying the area ratio of the core and bypass flows at the mixing plane and varying the area of the final exhaust nozzle produces a number of potential advantages to the engine's thermodynamic cycle in terms of performance and acoustics.

The present disclosure aims to provide a turbofan engine with an exhaust nozzle assembly capable of varying the area ratio of the core and bypass flows at the mixing plane to reduce fuel burn in supersonic cruise, increase thrust capability in transonic acceleration, and reduce noise during take-off.

SUMMARY OF THE DISCLOSURE

According to a first aspect there is a turbofan engine having:
an engine core having a centre axis and comprising in flow series a compressor, a combustor and a turbine;
a bypass duct surrounding the engine core, the bypass duct having a bypass duct exit area ($A_{COLD}$) at its downstream end; and
an exhaust nozzle assembly comprising:
coaxially arranged inner mixer and outer exhaust nozzles, the exhaust nozzle being axially downstream of said mixer nozzle;
a core flow duct defined by the mixer nozzle, the core flow duct having a core exit area ($A_{HOT}$); and
an exhaust duct defined at least in part by the exhaust nozzle downstream of the mixer nozzle, the exhaust duct having an exhaust throat area ($A_8$),
wherein the bypass duct exit area ($A_{COLD}$) and core exit area ($A_{HOT}$) are axially aligned at a mixing plane to form a mixing plane area ($A_{MIX}$);
wherein the turbofan engine has a transonic thrust condition, a supersonic cruise condition and a take-off condition;
wherein in the supersonic cruise condition, the exhaust throat area ($A_8$) is increased relative to the exhaust throat area ($A_8$) in the transonic condition; and
wherein in the take-off condition, the core exit area ($A_{HOT}$) is increased relative to the core exit area ($A_{HOT}$) in the transonic condition, and the bypass duct exit area ($A_{COLD}$) is decreased relative to the bypass duct exit area ($A_{COLD}$) in the transonic condition.

It has been found that varying the exhaust throat area ($A_8$), core exit area ($A_{HOT}$), and bypass duct exit area ($A_{COLD}$) as defined above, fuel burn in supersonic cruise can be reduced, thrust capability in transonic acceleration can be increased and noise during take-off can be reduced.

The engine may have any one or any combination of the following optional features.

Typically the engine has a controller, such as an engine electronic controller (EEC), which is configured to control the thrust produced by the engine over a range of flight operations. Thus the controller can be configured to control the exhaust throat area ($A_8$), the core exit area ($A_{HOT}$), and the bypass duct exit area ($A_{COLD}$).

In the supersonic cruise condition, the core exit area ($A_{HOT}$) may be increased by between 20 and 60% relative to the core exit area ($A_{HOT}$) in the transonic condition, the bypass duct exit area ($A_{COLD}$) may be decreased by 10 to 40% relative to the bypass duct exit area ($A_{COLD}$) in the transonic condition, and the mixing plane area ($A_{MIX}$) may be decreased by between 0 to 10% relative to the mixing plane area ($A_{MIX}$) in the transonic condition.

In the take-off condition, the core exit area ($A_{HOT}$) may be increased by between 40 and 60% relative to the core exit area ($A_{HOT}$) in the transonic condition, the bypass duct exit area ($A_{COLD}$) may be decreased by 25 to 40% relative to the bypass duct exit area ($A_{COLD}$) in the transonic condition, and the mixing plane area ($A_{MIX}$) may be decreased by between 5 to 10% relative to the mixing plane area ($A_{MIX}$) in the transonic condition.

In some embodiments, the nozzle assembly further comprises a plug axially mounted within the mixer nozzle. The plug comprises an axial variation in its diameter/radial cross-section i.e. the diameter/radial cross-section varies from its upstream end to its downstream end.

The term "upstream" is used to indicate a direction towards the fan and the term "downstream" is used to indicate a direction towards the exhaust nozzle.

The mixer nozzle or the plug may be axially translatable in order to effect the variation in the values of the core exit area ($A_{HOT}$), bypass duct exit area ($A_{COLD}$) and mixing plane area ($A_{MIX}$).

In some embodiments, the plug extends downstream from the mixer nozzle through the exhaust throat. In these embodiment's, the exhaust throat area is defined by the exit nozzle and the plug. In other embodiments, the plug extends downstream from the mixer nozzle and terminates with its downstream end within the exhaust duct upstream of the exhaust throat.

In some embodiments, in the supersonic cruise condition, the exhaust throat area ($A_8$) is increased by between 5 and 15% relative to the exhaust throat area ($A_8$) in the transonic condition.

In some embodiments, in the take-off condition, in the take-off condition, the exhaust throat area ($A_8$) is increased relative to the exhaust throat area ($A_8$) in the transonic condition. For example, the exhaust throat area ($A_8$) may be increased by between 0 and 15% relative to the exhaust throat area ($A_8$) in the transonic condition.

In some embodiments, the exhaust nozzle has circumferentially-arranged angularly-adjustable petals to increase/decrease the exhaust throat area ($A_8$). The petals can comprise primary and secondary articulating elements such that the exhaust throat area ($A_8$) can be moved from a position of minimum area in a convergent-divergent exhaust nozzle upstream of the exhaust nozzle exit area ($A_9$), to coincide with the exhaust nozzle exit area ($A_9$) in a purely convergent exhaust nozzle. In particular, it is preferred that the exhaust nozzle has a convergent-divergent configuration during runway take-off and throttled-back cutback/flyover climb-out conditions. For example, each petal may have a fixed upstream end and a free downstream end wherein the free ends can pivot/hinge about their respective fixed ends to adjust the angle each petal makes relative to the engine axis. The free-ends move away from the centre axis, such that the angle between each petal and the centre axis decreases to effect an increase in the exhaust throat area ($A_8$). The free-ends pivot towards the centre axis, such that the angle between each petal and the centre axis increases to effect a decrease in the exhaust throat area.

In some embodiments, the turbofan engine further comprises:
a fan located upstream of the engine core;
a supersonic intake for slowing down incoming air to subsonic velocities at an inlet to the fan formed by the intake;
wherein the fan is configured to generate a core airflow to the engine core and a bypass airflow through the bypass duct.

In some embodiments, the turbofan engine further comprises: a controller configured to control the exhaust throat area ($A_8$), the core exit area ($A_{HOT}$), and the bypass duct exit area ($A_{COLD}$).

In a second aspect, there is provided method of operating a turbofan engine having:
an engine core having a centre axis and comprising in flow series a compressor, a combustor and a turbine;
a bypass duct surrounding the engine core, the bypass duct having a bypass duct exit area ($A_{COLD}$) at its downstream end; and
an exhaust nozzle assembly comprising:
coaxially arranged inner mixer and outer exhaust nozzles, the exhaust nozzle being axially downstream of said mixer nozzle;
a core flow duct defined by the mixer nozzle, the core flow duct having a core exit area ($A_{HOT}$); and
an exhaust duct defined at least in part by the exhaust nozzle downstream of the mixer nozzle, the exhaust duct having an exhaust throat area ($A_8$),
wherein the bypass duct exit area ($A_{COLD}$) and core exit area ($A_{HOT}$) are axially aligned at a mixing plane to form a mixing plane area ($A_{MIX}$);
the method comprising:
performing a take-off operation;
performing a transonic thrust operation; and
performing a supersonic cruise operation;
wherein in the supersonic cruise condition, the exhaust throat area ($A_8$) is increased relative to the exhaust throat area ($A_8$) in the transonic condition; and
wherein in the take-off condition, the core exit area ($A_{HOT}$) is increased relative to the core exit area ($A_{HOT}$) in the transonic condition, the bypass duct exit area ($A_{COLD}$) is decreased relative to the bypass duct exit area ($A_{COLD}$) in the transonic condition.

Thus the method of the second aspect corresponds to the engine of the first aspect. Accordingly, optional features of the engine of the first aspect pertain singly or in any combination to the method of the second aspect.

In a third aspect, there is provided a supersonic aircraft having a turbofan engine according to the first aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
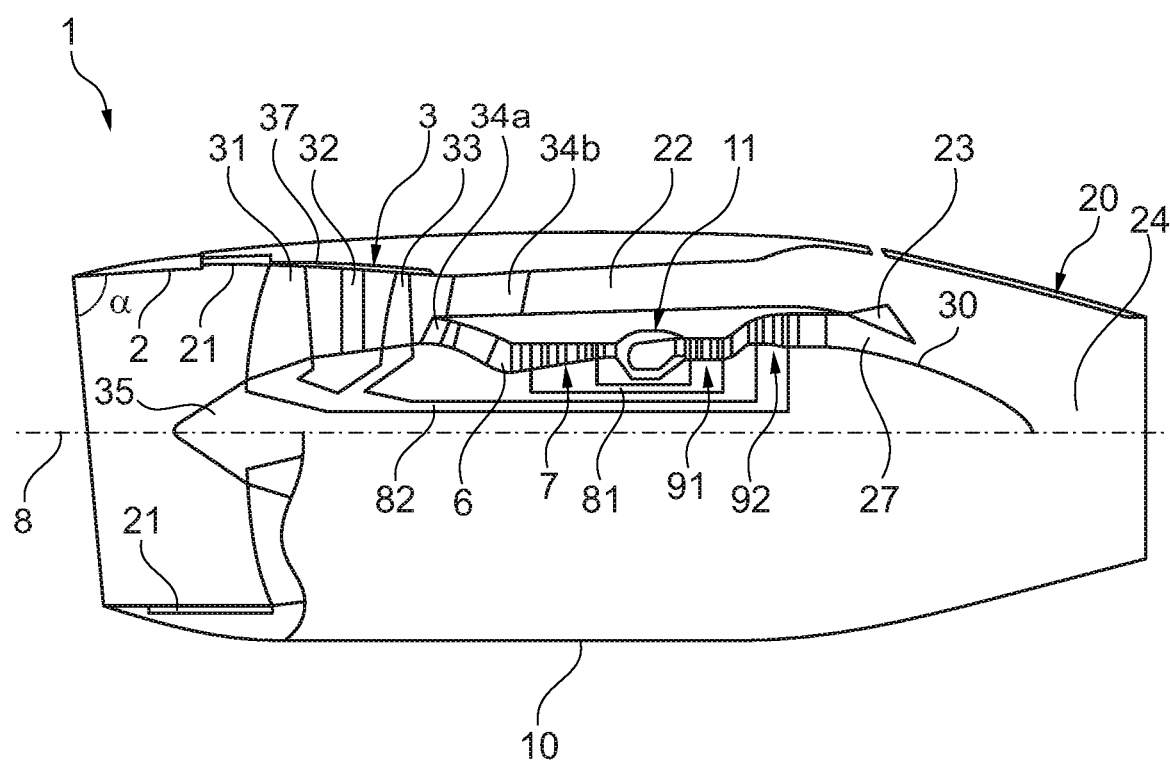
FIG. 1 is a sectional side view of a turbofan engine.

FIG. 1 shows a longitudinal cross-section through a turbofan engine 1 for a civil supersonic aircraft. The turbofan engine 1 comprises an engine intake 2, a multi-stage fan 3, a primary flow channel 6 that leads through a engine core, a secondary flow channel 22 that leads past the engine core, a mixer nozzle 23, and an exhaust nozzle 20 into which a thrust reverser (not shown) can be integrated.

The turbofan engine 1 has a centre axis 8 (also known as a machine axis or an engine centre line). The centre axis 8 defines an axial direction of the turbofan engine. A radial direction of the turbofan engine extends perpendicularly to the axial direction.

The engine core comprises in a per se known manner a compressor 7, a combustion chamber 11 and a turbine 91, 92. In the shown exemplary embodiment, the compressor comprises a high-pressure compressor 7. A low-pressure compressor is formed by the areas of the multi-stage fan 3 that are located close to the hub. The turbine that is arranged behind the combustion chamber 11 comprises a high-pressure turbine 91 and a low-pressure turbine 92. The high-pressure turbine 91 drives a high-pressure shaft 81 that connects the high-pressure turbine 91 to the high-pressure compressor 7. The low-pressure turbine 92 drives a low-pressure shaft 82 that connects the low-pressure turbine 92 to the multi-stage fan 3.

The turbofan engine 1 is arranged inside an engine nacelle 10. It is connected to the aircraft fuselage, for example via a pylon.

The engine intake 2 forms a supersonic air inlet and is correspondingly provided and suitable for slowing down the inflowing air to velocities of below Ma 1.0. In FIG. 1, but not necessarily, the engine intake is bevelled, forming an angle α, wherein the upper edge projects with respect to the lower edge. This serves for a better distribution of compression shocks as they occur in supersonic flight. However, in principle the engine intake can be formed in a straight manner, i.e. with an angle α of 90°, or a different angle than the one shown.

The engine intake 2 can have an interior cladding of a sound-absorbing material 21. This serves for reducing engine noise.

The fan can be formed as a multi-stage fan 3, in the shown exemplary embodiment as a double-stage fan. Accordingly, the multi-stage fan 3 comprises a fan rotor 31 and a fan stator 32 that form a first, frontal fan stage, as well as a fan rotor 33 and a fan stator (34a, 34b) that form a second, rear fan stage. Upstream, the fan 3 is provided with a nose cone 35. The fan rotors 31, 33 respectively comprise a plurality of rotor blades. The fan stator 32 of the frontal fan stage comprises a plurality of stator blades that are mounted in a fan housing 37. The fan stator of the rear fan stage is split and is formed by a guide baffle 34a that is formed at the entry of the primary flow channel 6, and formed by a guide baffle 34b that is formed at the entry of the secondary flow channel 5. The fan rotors 31, 33 can be configured in BLISK™ design and can be fixedly attached to each other.

Behind the fan rotor 33, the flow channel through the fan 3 is divided into the primary flow channel 6 and the secondary flow channel 22. Thus, both fan rotors 31, 33 are located upstream of the division of the flow channel into the primary flow channel 6 and the secondary flow channel 22. The secondary flow channel 22 is also referred to as the bypass flow channel or the bypass duct.

Behind the engine core, the primary flow inside the primary flow channel 6 and the secondary flow inside the bypass duct 22 are mixed by the mixer nozzle 23. Further, an outlet cone or plug 30 is inserted behind the turbine to realize the desired cross sections of the flow channel. The exhaust nozzle 20 can be a variable area exhaust nozzle.

Other gas turbine engines to which the present disclosure may be applied may have alternative configurations. By way of example such engines may have a different number of interconnecting shafts (e.g. one or three) and/or a different number of compressors and/or turbines and/or a single stage fan. Further the engine may comprise a gearbox provided in the drive train from a turbine to a compressor and/or fan.

Figure 2:
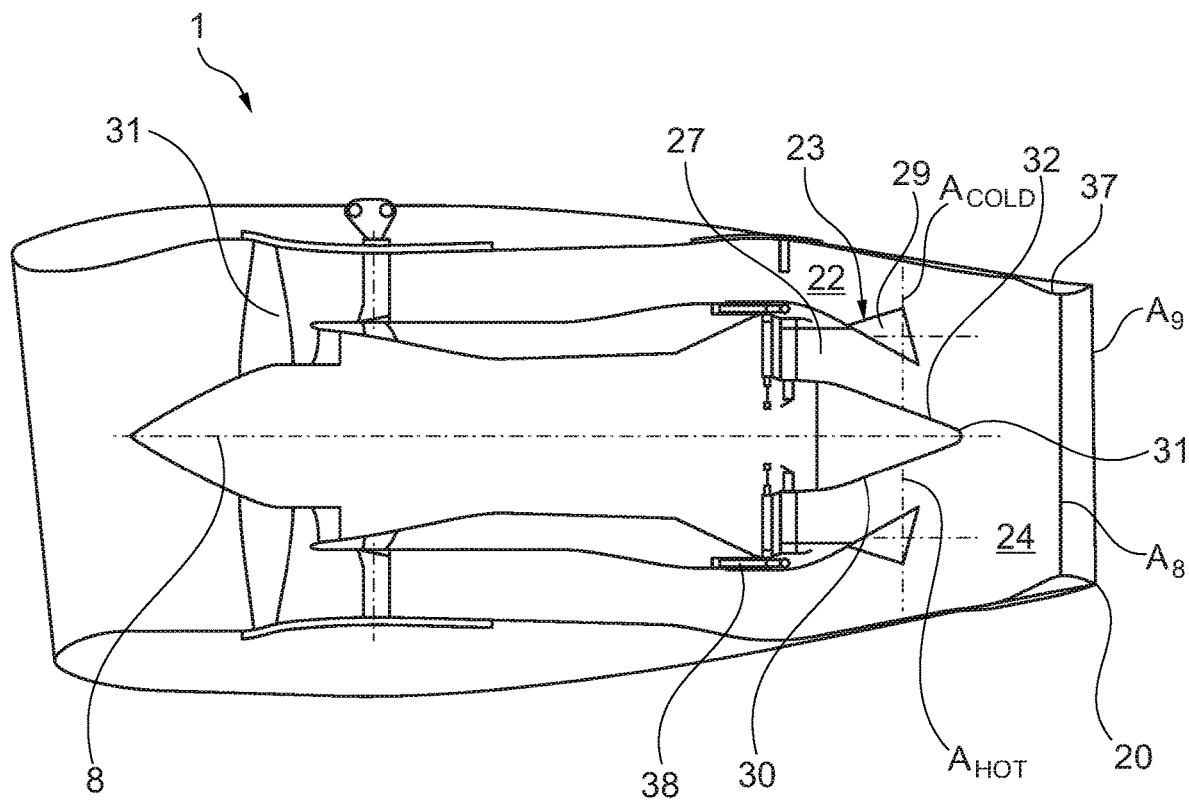
FIG. 2 is a simplified sectional side view of a turbofan engine in a supersonic cruise configuration.
Figure 3:
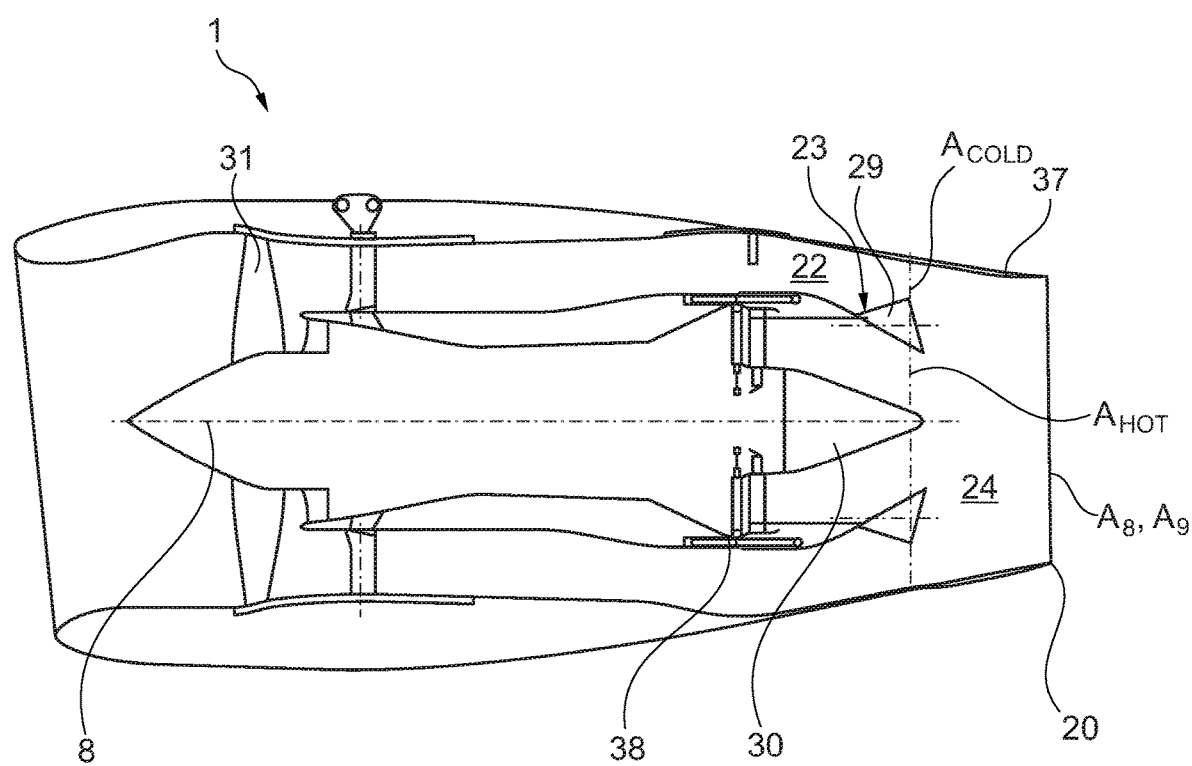
FIG. 3 is a simplified sectional view of the engine in an end of runway take-off configuration.

As shown in FIGS. 2 and 3, the exhaust nozzle 20 defines the radially outer periphery of an exhaust duct 24 and at its downstream axial end, defines the radially outer periphery of an exhaust throat area $A_8$.

The mixer nozzle 23 defines the radially outer periphery of a core duct 27 forming the end of the primary flow channel 6 and, at its downstream axial end, defines the radially outer periphery of a core exit area $A_{HOT}$. The core exit area $A_{HOT}$ forms part of a mixing plane where hot core flow from the engine core and cooler bypass flow from the bypass duct 22 mix. The bypass duct 22 has a bypass duct exit area $A_{COLD}$ at the mixing plane. The area of the mixing plane $A_{MIX}$ comprises the sum of the area of the core exit area $A_{HOT}$ and the bypass duct exit area $A_{COLD}$.

The mixer nozzle 23 comprises an axially-translatable converging mixer cowl 29 slidably mounted on a static portion of the engine core. The mixer cowl 29 may comprise lobes or chutes to facilitate mixing of the core flow and the bypass flow at the mixing plane.

The assembly further comprises a plug 30 axially mounted within and extending axially downstream from the mixer nozzle 23.

The plug 30 has an axial variation in its diameter/radial cross-section i.e. the diameter/radial cross-section varies from its upstream end to its downstream end.

In the embodiment shown in FIGS. 2 and 3, the plug has a conical downstream end portion 32 where the radial cross-sectional area of the plug decreases in a downstream direction from a maximum cross-sectional area to a minimum cross-sectional end (at the downstream extremity 30a of the plug 30).

The plug 30 defines the radially inner periphery of the (annular) core duct 27.

In the condition shown in FIG. 2, the mixer cowl 29 is in an upstream position retracted towards the engine core in a supersonic cruise configuration.

The core exit area $A_{HOT}$ and (at the mixing plane) is axially aligned with the plug 30 spaced from (i.e. distal from) the downstream extremity 30a of the plug 30. At this position, the diameter of the plug 30 is greater than its minimum diameter.

This results in an increased bypass duct exit area $A_{COLD}$ and a decreased core exit area $A_{HOT}$.

In the condition shown in FIG. 3, the mixer cowl 29 is in a downstream position extended away from the engine core in an end of runway take-off configuration.

The core exit area $A_{HOT}$ (at the mixing plane) is axially aligned with the plug 30 proximal the downstream extremity 30a of the plug 30. At this position, the diameter of the plug 30 is approaching its minimum diameter.

This results in a decreased bypass duct exit area $A_{COLD}$ and an increased core exit area $A_{HOT}$.

The mixer cowl 29 is operatively linked to a plurality of linear actuators 38 e.g. a plurality of hydraulic pistons which each effect axial translation of the mixer cowl 29. The may be located on the engine core or on the nacelle surrounding the engine core.

The exhaust nozzle 20 has a series of circumferentially-arranged angularly-adjustable petals 37 that can pivot towards and away from the centre axis 8 to adjust the angle each petal 37 makes relative to the engine axis 8. In particular, each petal can comprise primary and secondary elements (e.g. of the type used on the CONCORDE® supersonic passenger airliner to produce primary and secondary nozzle buckets), which articulate relative to each other so that the exhaust nozzle 20 can be converted from a convergent-divergent configuration (as shown in FIG. 2) in which the exhaust throat area $A_8$ upstream of the exhaust nozzle exit area $A_9$, to a purely convergent type nozzle (as shown in FIG. 3) in which the exhaust throat area $A_8$ coincides with the exhaust nozzle exit area $A_9$.

Figure 4:
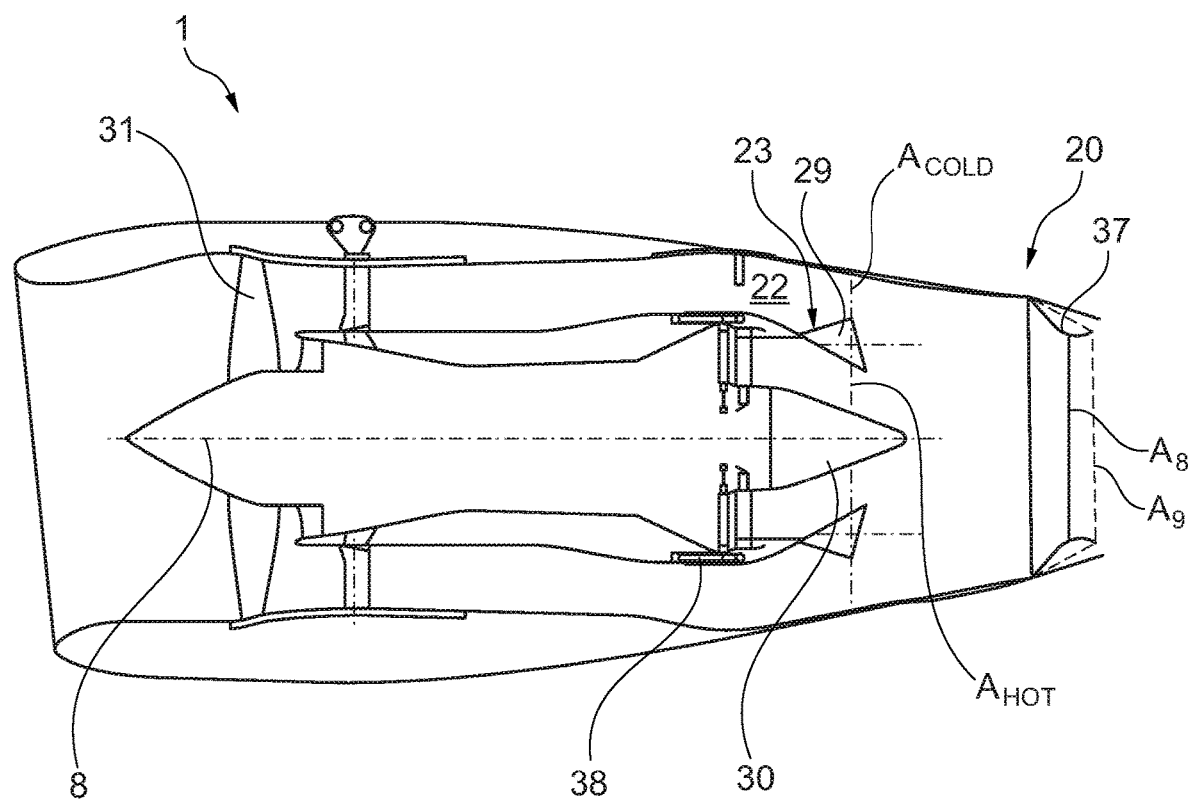
FIG. 4 is a simplified sectional side view of the engine in a transonic push configuration.

In the condition shown in FIG. 4, the mixer cowl 29 is in an upstream position retracted towards the engine core (as in FIG. 2) in a transonic push configuration.

The core exit area $A_{HOT}$ and (at the mixing plane) is axially aligned with the plug 30 spaced from (i.e. distal from) the downstream extremity 30a of the plug 30. At this position, the diameter of the plug 30 is greater than its minimum diameter.

This results in an increased bypass duct exit area $A_{COLD}$ and a decreased core exit area $A_{HOT}$.

In this condition, the angle of the exhaust nozzle petals 37 relative to the engine axis 8 is increased i.e. the free ends of the cowl petals 37 move towards the centre axis 8).

In this way, the exhaust throat area $A_8$ is reduced since the diameter of the exhaust nozzle 20 is decreased.

Also the petals 37 are adjusted so that the exhaust nozzle 20 has a convergent-divergent configuration in which the exhaust throat area $A_8$ upstream of the exhaust nozzle exit area $A_9$ is varied.

Figure 5:
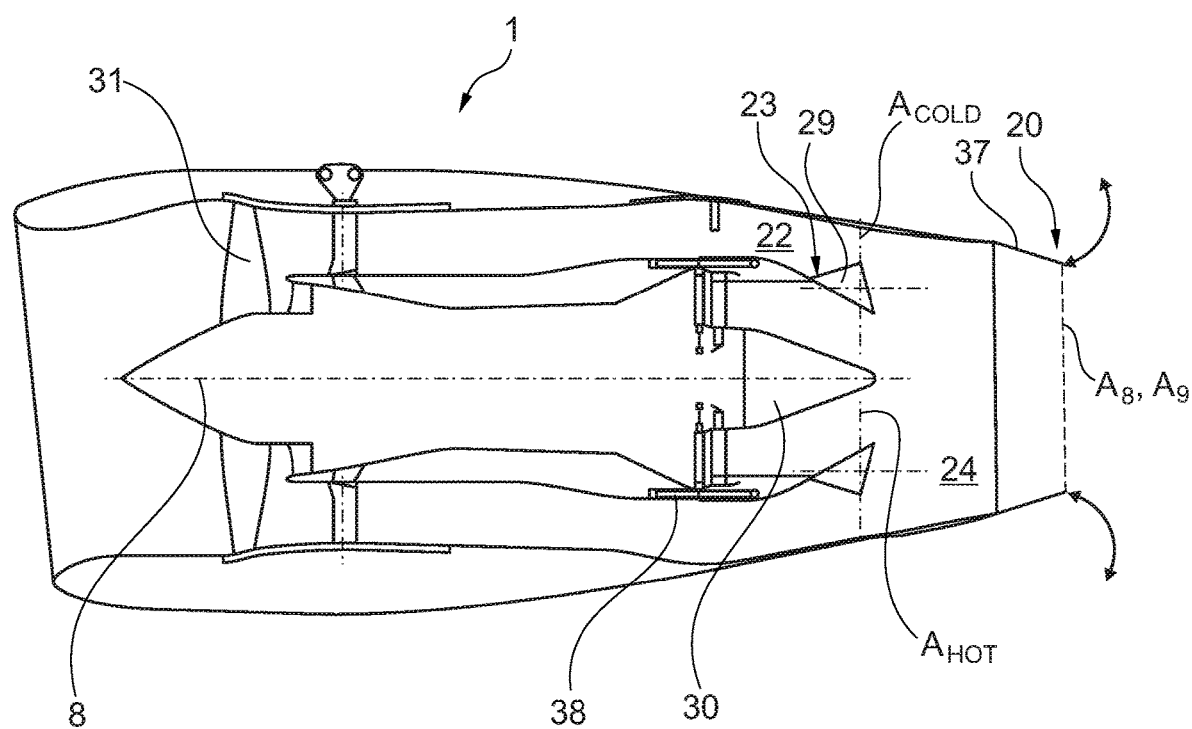
FIG. 5 is a simplified sectional view of the engine in a throttled-back cutback/flyover climb-out configuration.

In the condition shown in FIG. 5, the mixer cowl 29 is in a downstream position extended away from the engine core (as in FIG. 3) in a throttled-back cutback/flyover climb-out configuration.

The core exit area $A_{HOT}$ (at the mixing plane) is axially aligned with the plug 30 proximal the downstream extremity 30a of the plug 30. At this position, the diameter of the plug 30 is approaching its minimum diameter.

This results in a decreased bypass duct exit area $A_{COLD}$ and an increased core exit area $A_{HOT}$.

In this condition, the angle of the exhaust nozzle petals 37 relative to the engine axis 8 is small i.e. the free ends of the petals 37 are remote from the centre axis 8.

In this way, the exhaust throat nozzle area $A_8$ is maximised since the diameter of the exhaust nozzle 20 is increased.

Also the petals 37 are adjusted so that the exhaust nozzle 20 has a purely convergent configuration in which the exhaust throat area $A_8$ coincides with the exhaust nozzle exit area $A_9$.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A turbofan engine comprising:
    an engine core having a centre axis and comprising in flow series a compressor, a combustor and a turbine;
    a bypass duct surrounding the engine core, the bypass duct having a bypass duct exit area at its downstream end; and
    a nozzle assembly comprising:
        an inner mixer nozzle and an outer exhaust nozzle that are coaxially arranged about the centre axis, the exhaust nozzle being axially downstream of the mixer nozzle;
        a core flow duct defined by the mixer nozzle, the core flow duct having a core exit area; and
        an exhaust duct defined at least in part by the exhaust nozzle downstream of the mixer nozzle, the exhaust duct having an exhaust throat area,
    wherein the bypass duct exit area and the core exit area are axially aligned at a mixing plane to form a mixing plane area;
    wherein the turbofan engine has a transonic thrust condition, a supersonic cruise condition and a take-off condition; and
    wherein the turbofan engine further comprises means for adjusting the nozzle assembly by which:
        (1) in the supersonic cruise condition, the exhaust throat area is increased relative to the exhaust throat area in the transonic condition; and
        (2) in the take-off condition, (i) the core exit area is increased relative to the core exit area in the transonic condition and (ii) the bypass duct exit area is decreased relative to the bypass duct exit area in the transonic condition.

2. The turbofan engine according to claim 1, wherein in the supersonic cruise condition, and by way of the means for adjusting the nozzle assembly:
    (1) the core exit area is increased by between 20 and 60% relative to the core exit area in the transonic condition,
    (2) the bypass duct exit area is decreased by 10 to 40% relative to the bypass duct exit area in the transonic condition, and
    (3) the mixing plane area is decreased by between 0 to 10% relative to the mixing plane area in the transonic condition.

3. The turbofan engine according to claim 1, wherein in the take-off condition, and by way of the means for adjusting the nozzle assembly:
    (1) the core exit area is increased by between 40 and 60% relative to the core exit area in the transonic condition,
    (2) the bypass duct exit area is decreased by 25 to 40% relative to the bypass duct exit area in the transonic condition, and
    (3) the mixing plane area is decreased by between 5 to 10% relative to the mixing plane area in the transonic condition.

4. The turbofan engine according to claim 1, wherein:
    the nozzle assembly further comprises a plug axially mounted within the mixer nozzle, and
    the plug comprises an axial variation in its radial cross-section from its upstream end to its downstream end.

5. The turbofan engine according to claim 4, wherein:
    the means for adjusting the nozzle assembly comprises the mixer nozzle and the plug, and
    the mixer nozzle and the plug are axially translatable in order to effect variation in values of the core exit area, the bypass duct exit area and the mixing plane area.

6. The turbofan engine according to claim 1, wherein, in the supersonic cruise condition, and by way of the means for adjusting the nozzle assembly, the exhaust throat area is increased by between 5 and 15% relative to the exhaust throat area in the transonic condition.

7. The turbofan engine according to claim 1, wherein in the take-off condition, and by way of the means for adjusting the nozzle assembly, the exhaust throat area is increased relative to the exhaust throat area in the transonic condition.

8. The turbofan engine according to claim 7, wherein in the take-off condition, and by way of the means for adjusting the nozzle assembly, the exhaust throat area is increased by between 0 and 15% relative to the exhaust throat area in the transonic condition.

9. The turbofan engine according to claim 1, further comprising:
- a fan located upstream of the engine core; and
- a supersonic intake for slowing down incoming air to subsonic velocities at an inlet to the fan formed by the intake;
- wherein the fan is configured to generate a core airflow to the engine core and a bypass airflow through the bypass duct.

10. The turbofan engine according to claim 1, wherein the means for adjusting the nozzle assembly comprises a controller configured to control the exhaust throat area, the core exit area, and the bypass duct exit area.

11. A supersonic aircraft having a turbofan engine according to claim 1.

12. A method of operating a turbofan engine, the turbofan engine comprising:
- an engine core having a centre axis and comprising in flow series a compressor, a combustor and a turbine;
- a bypass duct surrounding the engine core, the bypass duct having a bypass duct exit area at its downstream end; and
- a nozzle assembly comprising:
  - an inner mixer nozzle and an outer exhaust nozzle that are coaxially arranged about the centre axis, the exhaust nozzle being axially downstream of the mixer nozzle;
  - a core flow duct defined by the mixer nozzle, the core flow duct having a core exit area; and
  - an exhaust duct defined at least in part by the exhaust nozzle downstream of the mixer nozzle, the exhaust duct having an exhaust throat area,
- wherein the bypass duct exit area and the core exit area are axially aligned at a mixing plane to form a mixing plane area; and
- the method comprising:
  - performing a take-off operation;
  - performing a transonic thrust operation; and
  - performing a supersonic cruise operation;
- wherein in the supersonic cruise condition, the exhaust throat area is increased relative to the exhaust throat area in the transonic condition; and
- wherein in the take-off condition, (i) the core exit area is increased relative to the core exit area in the transonic condition and (ii) the bypass duct exit area is decreased relative to the bypass duct exit area in the transonic condition.

13. The method according to claim 12, further comprising, in the supersonic cruise condition:
(1) increasing the core exit area by between 20 and 60% relative to the core exit area in the transonic condition,
(2) decreasing the bypass duct exit area by 10 to 40% relative to the bypass duct exit area in the transonic condition, and
(3) decreasing the mixing plane area by between 0 to 10% relative to the mixing plane area in the transonic condition.

14. The method according to claim 12, further comprising, in the take-off condition:
(1) increasing the core exit area by between 40 and 60% relative to the core exit area in the transonic condition,
(2) decreasing the bypass duct exit area by 25 to 40% relative to the bypass duct exit area in the transonic condition, and
(3) decreasing the mixing plane area by between 5 to 10% relative to the mixing plane area in the transonic condition.

15. The method according to claim 12, further comprising, in the supersonic cruise condition, increasing the exhaust throat area by between 5 and 15% relative to the exhaust throat area in the transonic condition.

16. The method according to claim 12, further comprising, in the take-off condition, increasing the exhaust throat area by between 0 and 15% relative to the exhaust throat area in the transonic condition.

\* \* \* \* \*